(12) United States Patent
Cope et al.

(10) Patent No.: US 8,265,251 B1
(45) Date of Patent: Sep. 11, 2012

(54) SYSTEM AND METHOD TO PROVIDE SERVICES FROM A COMMUNICATION NETWORK TO A MEDIA-DELIVERY NETWORK VIA A HOST DEVICE CONNECTED TO THE MEDIA-DELIVERY NETWORK

(75) Inventors: Warren B. Cope, Olathe, KS (US); Von K. McConnell, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 289 days.

(21) Appl. No.: 12/787,434

(22) Filed: May 26, 2010

Related U.S. Application Data

(62) Division of application No. 11/026,979, filed on Dec. 30, 2004, now Pat. No. 7,792,094.

(51) Int. Cl.
*H04M 3/42* (2006.01)
*H04L 12/66* (2006.01)
*H04N 7/173* (2011.01)

(52) U.S. Cl. .............. 379/201.01; 370/352; 379/201.02; 455/414.1; 725/106; 725/109

(58) Field of Classification Search .................. 370/352; 379/106.01, 201.01, 201.02, 207.14; 455/414.1; 725/106, 109, 132
See application file for complete search history.

(56) References Cited

U.S. PATENT DOCUMENTS

| | | | |
|---|---|---|---|
| 5,557,320 A | 9/1996 | Krebs | |
| 6,546,094 B1 | 4/2003 | Turner et al. | |
| 6,570,974 B1 | 5/2003 | Gerszberg et al. | |
| 6,678,673 B1 | 1/2004 | Eves et al. | |
| 7,120,139 B1 | 10/2006 | Kung et al. | |
| 7,251,485 B2 | 7/2007 | Ikeda et al. | |
| 7,636,578 B1 | 12/2009 | Cope et al. | |
| 7,729,343 B2 * | 6/2010 | Kodaka ......................... | 370/352 |
| 7,792,094 B1 * | 9/2010 | Cope et al. ..................... | 370/352 |
| 2002/0035699 A1 | 3/2002 | Crosbie | |
| 2002/0122391 A1 | 9/2002 | Shalit | |
| 2002/0131402 A1 | 9/2002 | Lee et al. | |
| 2003/0039242 A1 | 2/2003 | Moore, Jr. | |
| 2003/0133413 A1 | 7/2003 | Mehravari | |
| 2003/0226143 A1 | 12/2003 | Michael et al. | |
| 2004/0260772 A1 | 12/2004 | Mullen et al. | |
| 2004/0261092 A1 * | 12/2004 | Addington et al. ............. | 725/25 |
| 2004/0261114 A1 * | 12/2004 | Addington et al. ........... | 725/106 |
| 2005/0060230 A1 | 3/2005 | Kaye | |
| 2005/0066365 A1 | 3/2005 | Rambo | |
| 2005/0152343 A1 | 7/2005 | Rajagopalan | |
| 2005/0182617 A1 | 8/2005 | Reynar et al. | |
| 2005/0232242 A1 | 10/2005 | Karaoguz | |
| 2006/0140382 A1 | 6/2006 | Huey | |
| 2006/0167976 A1 | 7/2006 | Brown et al. | |
| 2008/0037471 A1 | 2/2008 | Chen et al. | |
| 2010/0046729 A1 | 2/2010 | Bifano et al. | |

* cited by examiner

*Primary Examiner* — Harry Hong

(57) ABSTRACT

The present invention relates to a system and method for integrating telecommunications and cable networks for the purpose of providing telephone services to a cable host device over a cable network. The methods include registering a cable host device to receive telephone services, downloading telephone service software to a cable host device, cable host device sign on to the telephone services, associating a telephone with a cable host device, temporarily registering a cable host device, and activating and deactivating telephone services for a cable host device. Also described are systems for connecting telephone and cable networks to enable telephone services to be provided by cable host devices.

8 Claims, 11 Drawing Sheets

SYSTEM AND METHOD TO PROVIDE SERVICES FROM A COMMUNICATION NETWORK TO A MEDIA-DELIVERY NETWORK VIA A HOST DEVICE CONNECTED TO THE MEDIA-DELIVERY NETWORK

CROSS-REFERENCE TO RELATED APPLICATIONS

This application is a divisional of U.S. application Ser. No. 11/026,979, filed Dec. 30, 2004.

STATEMENT REGARDING FEDERALLY SPONSORED RESEARCH OR DEVELOPMENT

None.

TECHNICAL FIELD

The present invention relates to integrating communication networks, such as telecommunication networks, and media-delivery networks, such as cable television networks. More particularly, the present invention relates to a system and method for integrating communication and media delivery networks for the purpose of providing communication services to a host device through a media-delivery network.

BACKGROUND OF THE INVENTION

Mobile phone users do not always keep their phones in their immediate vicinity, nor do users keep their phones perpetually turned on. Further, there are occasions when using a mobile phone, while possible, may be inconvenient. In either illustrative situation, telephone services are unavailable. If telephone services were able to be delivered via alternate mechanisms, including mechanisms that take advantage of devices that are present in the user's home, then the value of the services would be increased and functionally extended. One such alternate mechanism could be the use of a cable host device that normally facilitates the delivery of cable television programming.

SUMMARY OF THE INVENTION

The present invention relates to a system and method for integrating communication and media-delivery networks for the purpose of providing communication services to a host device over a media-delivery network.

BRIEF DESCRIPTION OF THE SEVERAL VIEWS OF THE DRAWINGS

The present invention is described in detail below with reference to the attached drawing figures, which are incorporated by reference herein, and wherein.

DETAILED DESCRIPTION OF THE INVENTION

Figure 1:
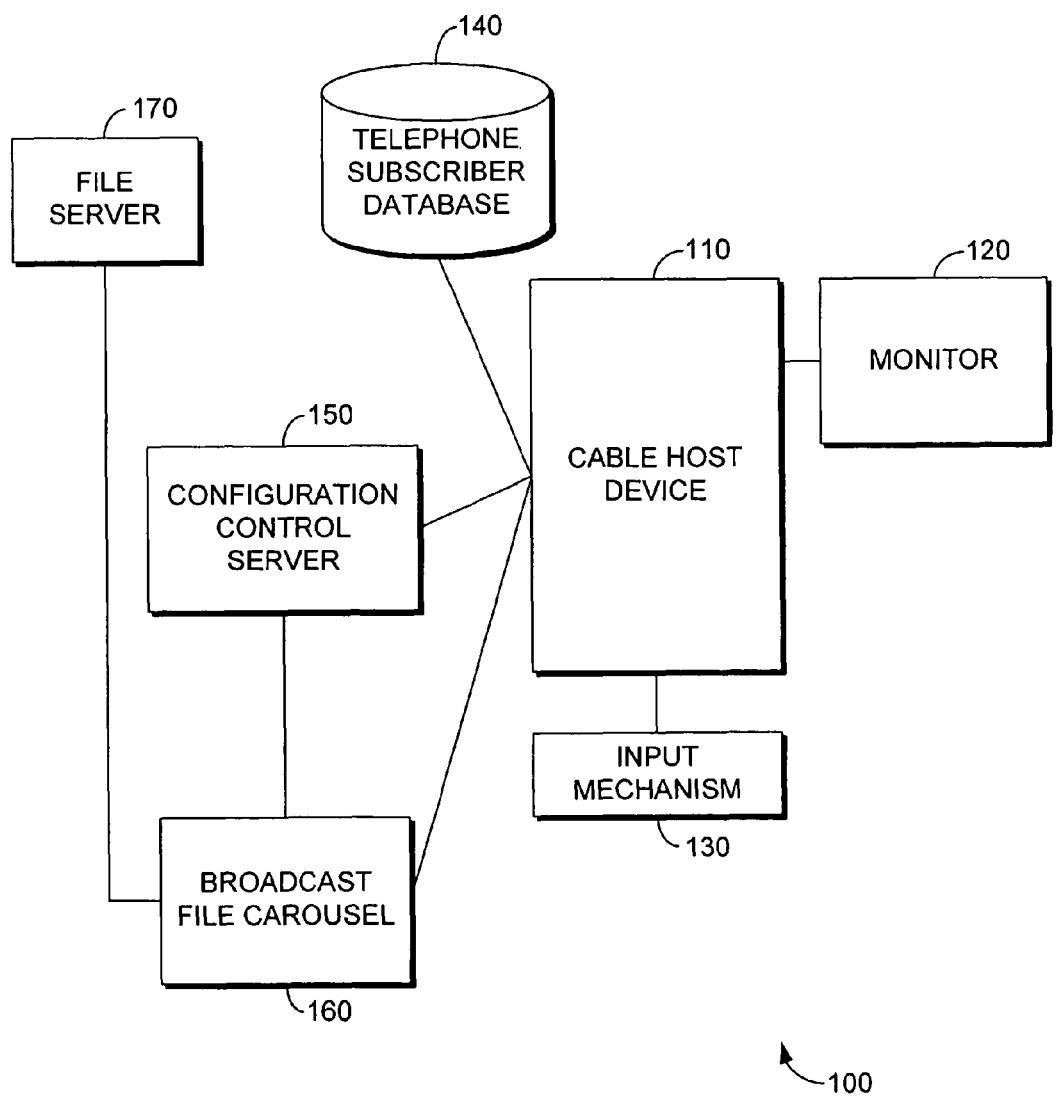
FIG. 1 illustrates a system architecture for hosting telephone services on a cable host device in accordance with an embodiment of the present invention.

The present invention permits the integration of one or more communication network with one or more media-delivery network. One result of the integration is the ability to deliver communication services over the media-delivery network to a host device. While the type of communication network described in detail herein is a telecommunication network, and, more particularly, a mobile telecommunication network, one skilled in the art will appreciate that the present invention may be implemented with other types of communication networks permitting the multi-directional exchange of information (in any format, including analogue). Likewise, one skilled in the art will appreciate that while cable television networks are described herein as an example of a media-delivery network, the present invention may be implemented with other types of media delivery networks that permit the substantially uni-directional delivery of media content.

Telephone services provided via a mobile telephone may be delivered to a cable host device in accordance with an embodiment of the present invention. A telephone network that provides telephone services is usually owned by a telephone carrier and is separate from a cable network that provides cable-television programming and is owned by a cable operator.

The present invention may deliver communication services associated with a communication network, such as a mobile telephone network, to a media-delivery network, such as digital cable television, by interfacing the two networks, for example at a cable head end, and delivering services over the media-delivery network. In the example of digital cable television services may be delivered on the unbound signaling channel typically employed in a digital cable television network or on one or more bound digital cable channels. In accordance with the present invention, services may be delivered on any type of bound digital channel, including a premium channel, a pay-per-view channel, a regular channel, or an unbound channel used to deliver programming information.

In a digital cable television network, content is delivered on multiple bound channels, and a user selects content by selecting at the cable host device the channel on which the desired content is available. The cable host device then displays the content on the desired channel on a monitor, which is often a television screen. Media content on bound channels flows uni-directionally from a cable headend to the cable host devices connected to that cable headend.

A digital cable network also uses one or more unbound channels to exchange information other than media content bi-directionally between a cable host device and a cable headend. For example, information regarding upcoming programming on bound channels may be transmitted on an unbound channel from the cable headend to the cable host device. Selection by a user may then cause such programming information to be displayed on a monitor. However, information may also be transmitted from a cable host device to a cable headend, such as registration information upon power up of the cable host device and information necessary for authentication and/or billing upon selection of pay-per-view program by a user.

Although there is no reason that the present invention could not be implemented in a wholly owned scenario wherein both the telephone network and the cable network belong to the same entity, the invention is described in detail herein for the exemplary scenario where two entities must cooperatively integrate separate networks to provide the services.

Referring to FIG. 1, an architecture 100 to host telephone services on a cable host device is illustrated in accordance with an embodiment of the present invention. A cable host device 110 is connected to a monitor 120 and an input mechanism 130. Cable host device 110 may be, for example, a separate device such as is commonly referred to as a set-top box or built in to monitor 120. Examples of cable host device 110 include a television set-top box or a television-integrated component for hosting cable television software. Cable host device 110 may be manufactured with a Media Access Control (MAC) address that may be used to uniquely identify the device within a network of similar devices.

In one embodiment, cable host device 110 includes resident software to provide channel guides and programming content. Information regarding channel guides and programming content may be received over an unbound channel. Examples of such cable-host-device software include resident navigator applications such as Passport or Scientific Atlanta Resident Application (SARA) and operating-system software such as PowerTV. Examples of monitor 120 connected to cable host device 110 include a television or a computer monitor. Input mechanism 130 may be an infra-red remote control device sensed by cable host device 110. Other devices, such as mobile telephones, keyboards, or personal digital assistants (PDAs) could provide the same functionality. The connection between input mechanism 130 and cable host device 110 may be wireless, such as an infra-red, radio, 802.11x, Bluetooth, etc., or directly by a cable or other physical connection such as a Universal Serial Bus (USB) connector. Input mechanism 130 may directly interface with cable host device 110 as in the case of a set-top box or may interface with cable host device 110 via an intermediary device such as a personal computer.

Cable host device 110 connects to a telephone subscriber database 140 to receive the telephone services by transmitting information over an unbound channel. One skilled in the art will appreciate that cable host device 110 connecting to telephone subscriber database 140 may involve intermediate steps and equipment between the host device 110 and the database 140. Cable host device 110 connects to configuration control server 150 which controls addressing and content for a plurality of cable host devices. Cable host device 110 also connects to a broadcast file carousel 160. Broadcast file carousel 160 may receive programming and place programming on bound channels for transmission to cable host device 110. Configuration control server 150 connects to broadcast file carousel 160 to indicate when telephone services content should be transmitted to cable host device 110.

In accordance with the present invention, information necessary to deliver communication services to cable host device 110 may be transmitted in any fashion. For example, a communication services database 140 may transmit information to cable host device 110 over an unbound channel, either directly or through an intermediary such as configuration control server 150. Alternatively, a communication file server 170 may connect to broadcast file carousel 160 to deliver information for a service for insertion on a bound channel by broadcast file carousel 160 for transmission to cable host device 110.

Figure 2:
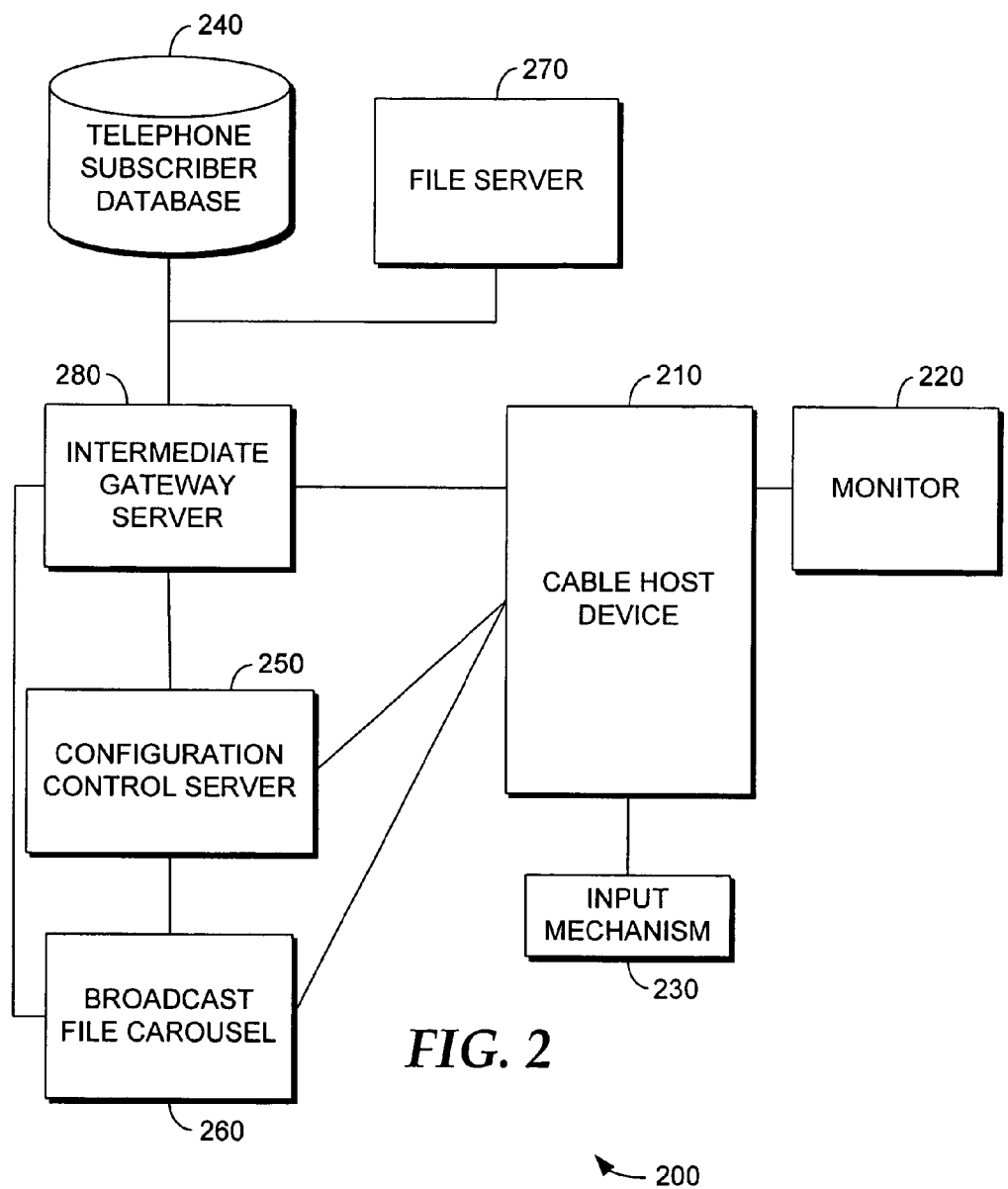
FIG. 2 illustrates a further system architecture for hosting telephone services on a cable host device in accordance with an embodiment of the present invention.

Referring now to FIG. 2, a further architecture 200 to host telephone services on a cable host device is illustrated in accordance with an embodiment of the present invention. A cable host device 210 is connected to a monitor 220 and an input mechanism 230. Cable host device 210 may be, for example, a separate device such as is commonly referred to as a set-top box or built in to monitor 220. Examples of cable host device 210 include a television set-top box or a television-integrated component for hosting cable television software. Cable host device 210 may be manufactured with a MAC address that may be used to identify the device uniquely within a network of similar devices. Examples of monitor 220 connected to cable host device 210 include a television or a computer monitor. Input mechanism 230 may be an infra-red remote control device sensed by cable host device 210. Other devices such a mobile telephones, keyboards, or PDAs could provide the same capability. The connection between input mechanism 230 and cable host device 210 may be wireless, such as an infra-red or a Bluetooth link or directly by a cable or other physical connection such as a USE connector. Input mechanism 230 may directly interface with cable host device 210 as in the case of a set-top box or may interface with cable host device 210 via an intermediary device such as a personal computer.

Cable host device 210 connects to an intermediate gateway server 280. Intermediate gateway server 280 connects to a telephone subscriber database 240 to receive the telephone services and to file server 270 to receive telephone services software. Cable host device 210 connects to configuration control server 250 which controls addressing and content for a plurality of cable host devices. Cable host device 210 connects to a broadcast file carousel 260 which receives telephone services content from intermediate gateway server 280. Configuration control server 250 connects to broadcast file carousel 260 to indicate when telephone services content should be transmitted to cable host device 210.

Figure 3:
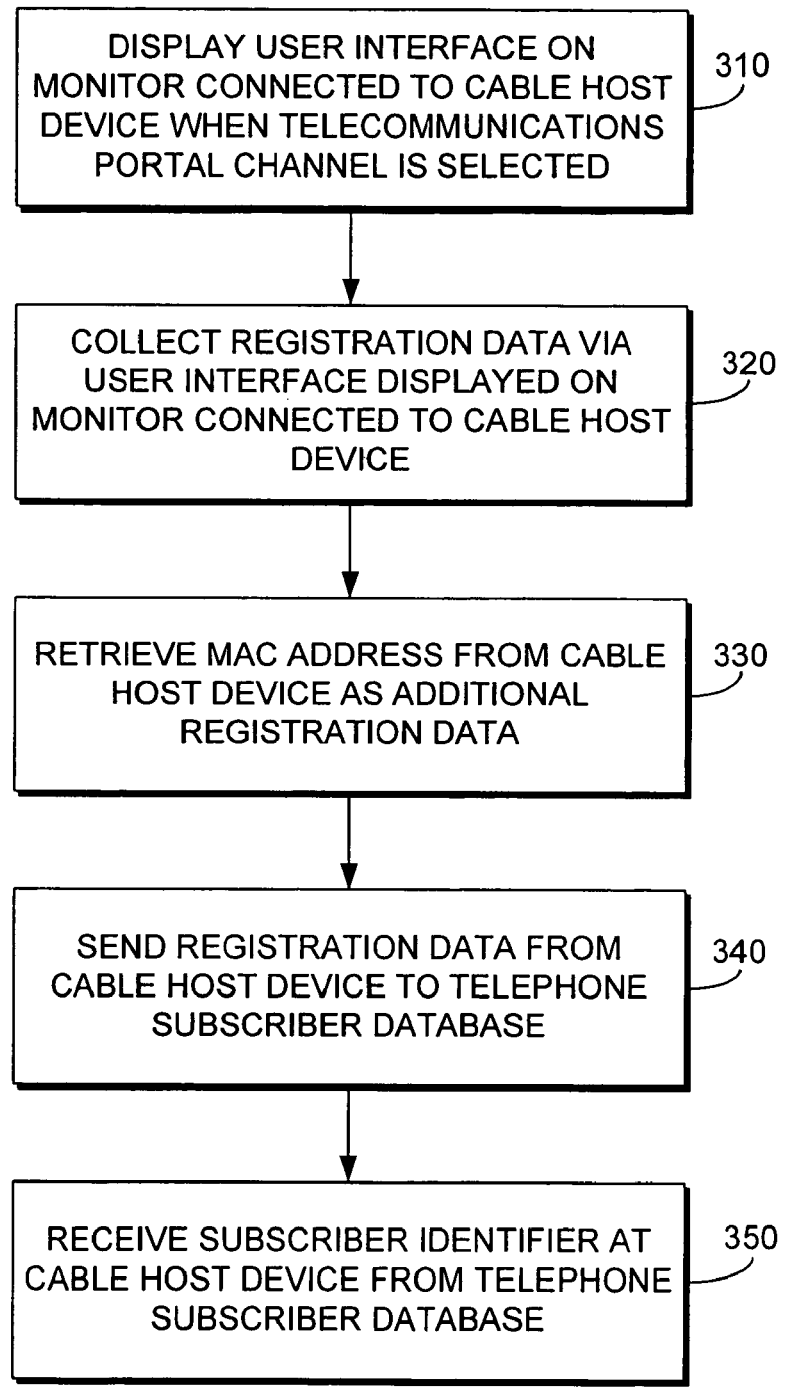
FIG. 3 illustrates a method for registering a cable host device to receive telephone services in accordance with an embodiment of the present invention.

Referring now to FIG. 3, a method 300 for registering a cable host device to receive telephone services is illustrated in accordance with an embodiment of the present invention. Step 310 displays a user interface on monitor 120 connected to cable host device 110 when a telecommunications portal channel is selected. The telecommunications portal channel may be a specific numbered channel that when selected on cable host device 110 executes a telecommunications application designed to manage telephone services provided by cable host device 110. Telecommunications portal channel may be any type of channel, such as a pay-per-view channel, a premium channel, a regular channel, or an information channel, such as sometimes used to deliver programming information to a cable host device. The registration data may include telephone numbers, account numbers, subscriber name, services to activate or deactivate, email address, or MAC address of cable host device 110 as well as any other information required to manage the telephone services provided by cable host device 110. Step 320 collects registration data necessary to register the cable host device to receive telephone services via the user interface displayed in step 310. Optionally, step 330 retrieves the MAC address of cable host device 110 as additional registration data. Step 340 sends registration data from cable host device 110 to telephone subscriber database 140. In step 350, cable host device 110 receives a subscriber identifier from telephone subscriber database 140. Step 340 and step 350 may be performed in accordance with current methods used to register a cable host device with a cable television network although any transmission method and/or protocol may be used in accordance with the present invention.

Figure 4:
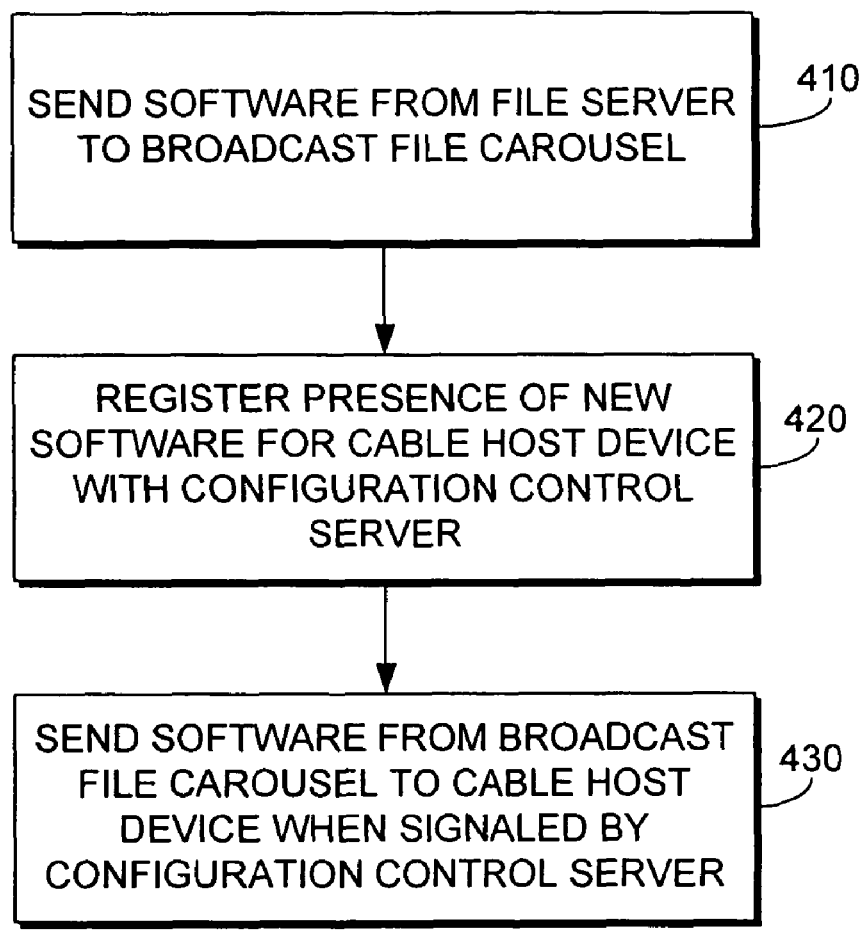
FIG. 4 illustrates a method for downloading telephone services software to a cable host device in accordance with an embodiment of the present invention.

Referring now to FIG. 4, a method 400 for downloading telephone services software to a cable host device is illustrated in accordance with an embodiment of the present invention. In step 410, telephone services software is sent from file server 170 to broadcast file carousel 160. Step 420 registers the presence of new software for download to cable host device 110 with a configuration control server 150. Step 430 sends the software from broadcast file carousel 160 to cable host device 110 when signaled by configuration control server 150. Method 400 may utilize routines, methods and protocols such as may be used to update software and/or firmware on a cable host device during its operation on a digital television network.

Figure 5:
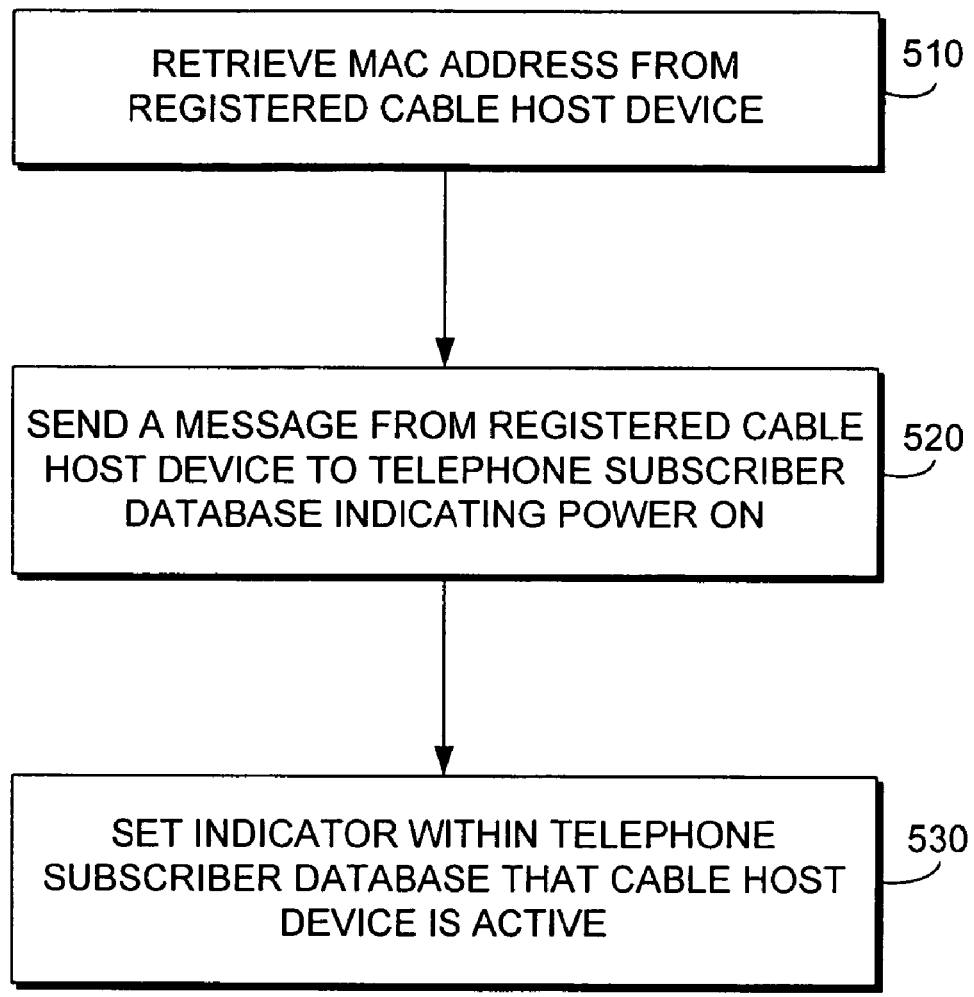
FIG. 5 illustrates a method in accordance with an embodiment of the present invention for signing on a registered cable host device to a telephone network.

Referring now to FIG. 5, a method 500 for signing on a registered cable host device to receive telephone services is illustrated in accordance with an embodiment of the present invention. Optionally, step 510 retrieves the MAC address from the registered cable host device 110. Step 520 sends a message from the registered cable host device 110 to telephone subscriber database 140 indicating that cable host device 110 has been powered on. Step 530 sets an indicator within telephone subscriber database 140 that cable host device 110 is active.

Figure 6:
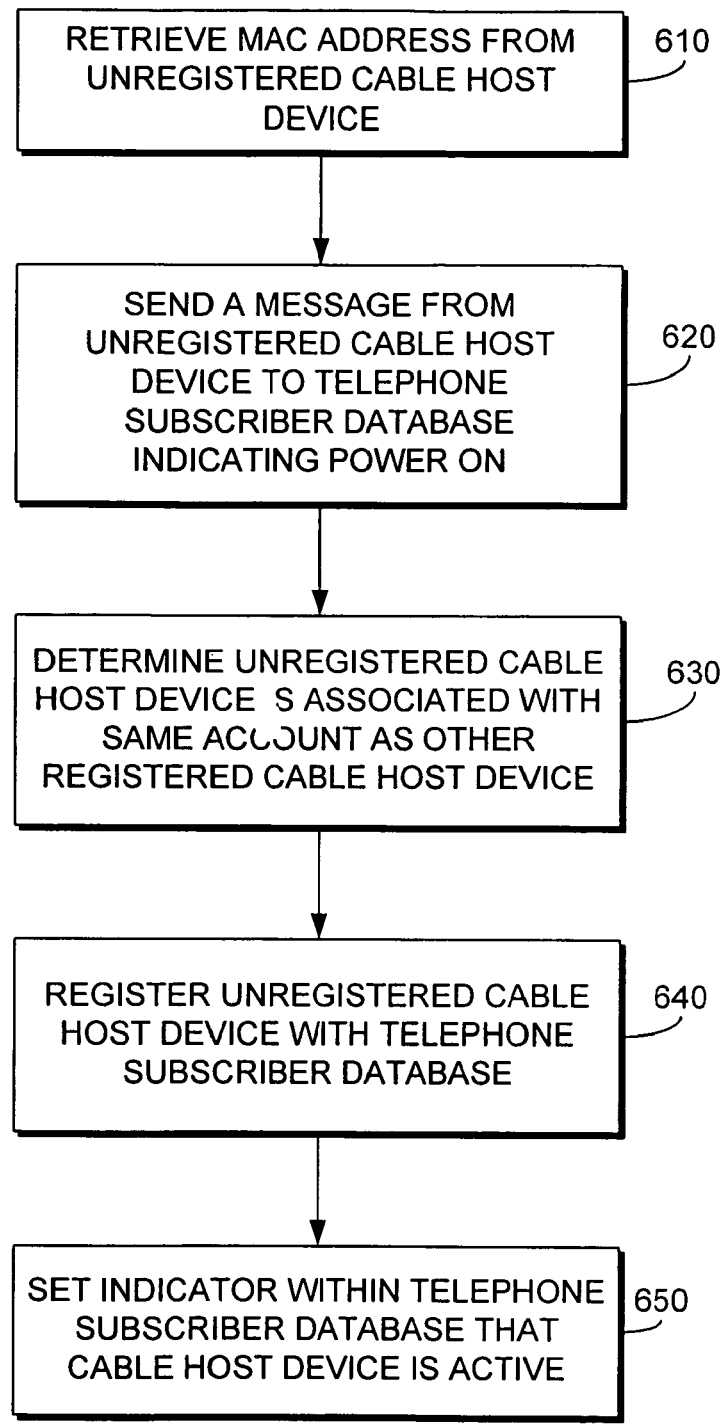
FIG. 6 illustrates a method in accordance with an embodiment of the present invention for signing on an unregistered cable host device to a telephone network.

Referring now to FIG. 6, a method 600 for signing on an unregistered cable host device to receive telephone services is illustrated in accordance with an embodiment of the present invention. Optionally, step 610 retrieves the MAC address from the unregistered cable host device 110. Step 620 sends a message from the unregistered cable host device 110 to telephone subscriber database 140 indicating that cable host device 110 has been powered on. In step 630, telephone subscriber database 140 determines that cable host device 110 has not been previously registered and is associated with a valid telephone services account. Step 640 registers the unregistered cable host device 110 with telephone subscriber database 140. Step 650 sets an indicator within telephone subscriber database 140 that cable host device 110 is active.

Figure 7:
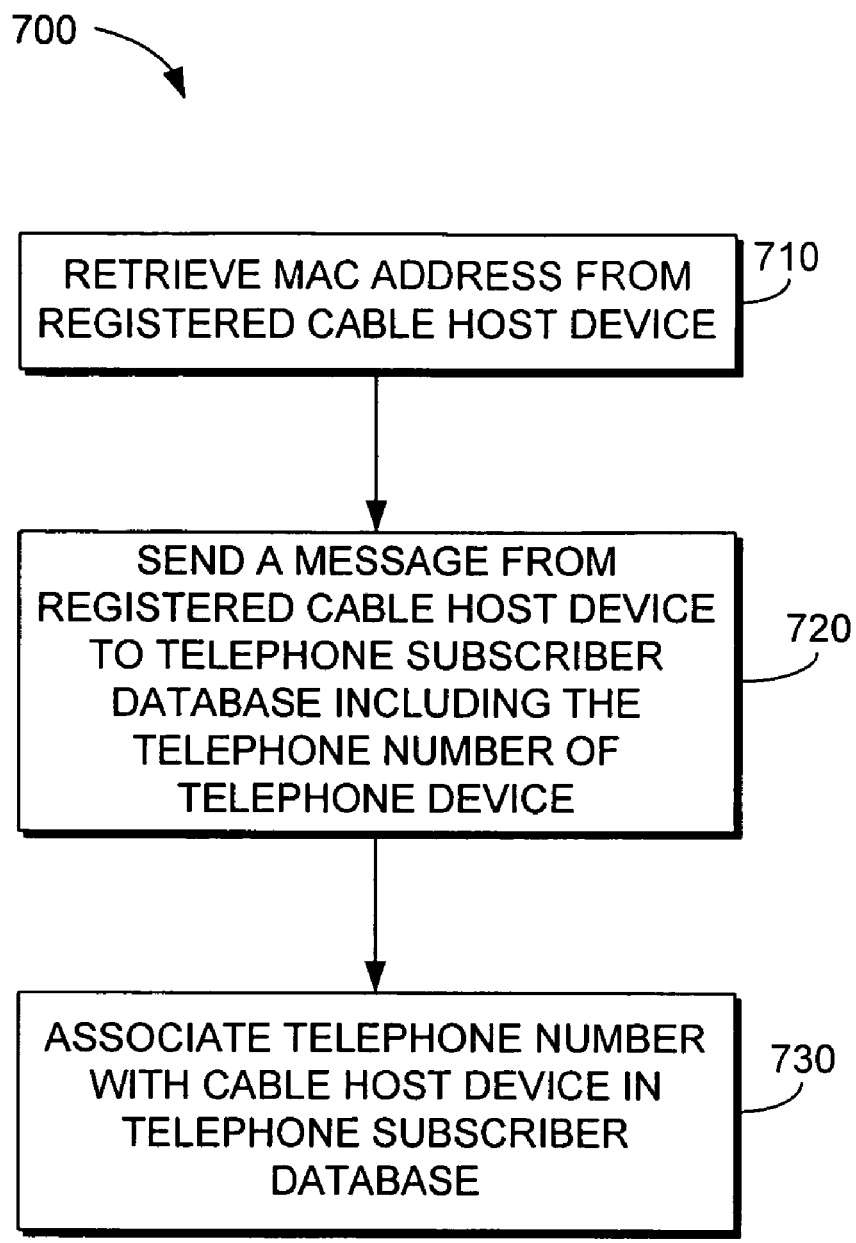
FIG. 7 illustrates a method in accordance with an embodiment of the present invention for adding a telephone number to a registered cable host device.

Referring now to FIG. 7, a method 700 for registering a new telephone number to receive telephone services on a registered cable host device is illustrated in accordance with an embodiment of the present invention. Optionally, step 710 retrieves the MAC address from the registered cable host device 110. Step 720 sends a message from the registered cable host device 110 to telephone subscriber database 140 including the telephone number of the telephone device. Step 730 associates the telephone number with the cable host device 110 in telephone subscriber database 140.

Figure 8:
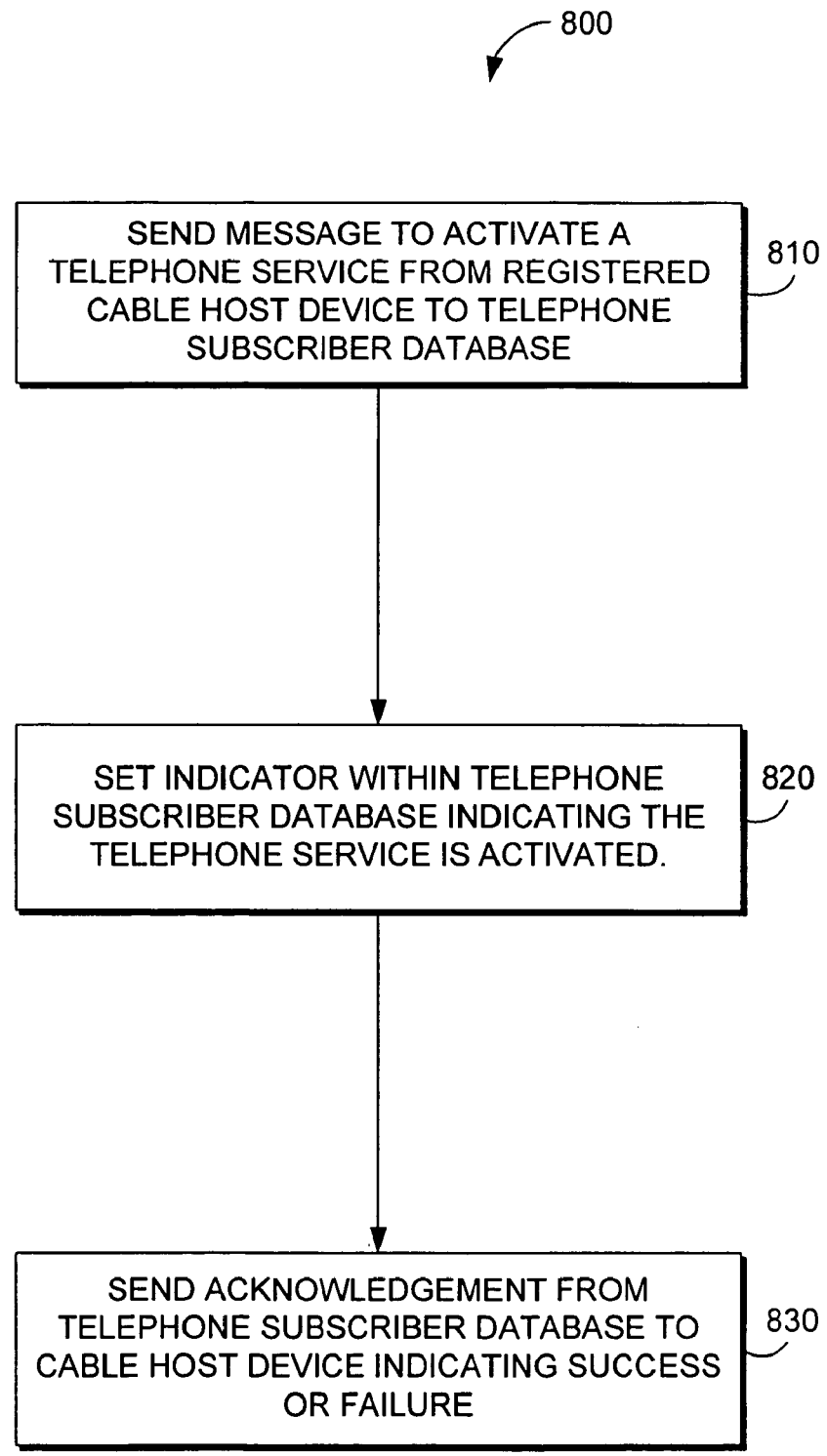
FIG. 8 illustrates a method in accordance with an embodiment of the present invention for activating a telephone service from a registered cable host device.

Referring now to FIG. 8, a method 800 for activating a new telephone service from a registered cable host device is illustrated in accordance with an embodiment of the present invention. Step 810 sends a message to activate a telephone service from a registered cable host device 110 to telephone subscriber database 140. Step 820 sets an indicator within telephone subscriber database 140 indicating the requested telephone service is activated. In step 830, telephone subscriber database 140 sends an acknowledgement to cable host device 110 indicating whether the service activation succeeded or failed.

Figure 9:
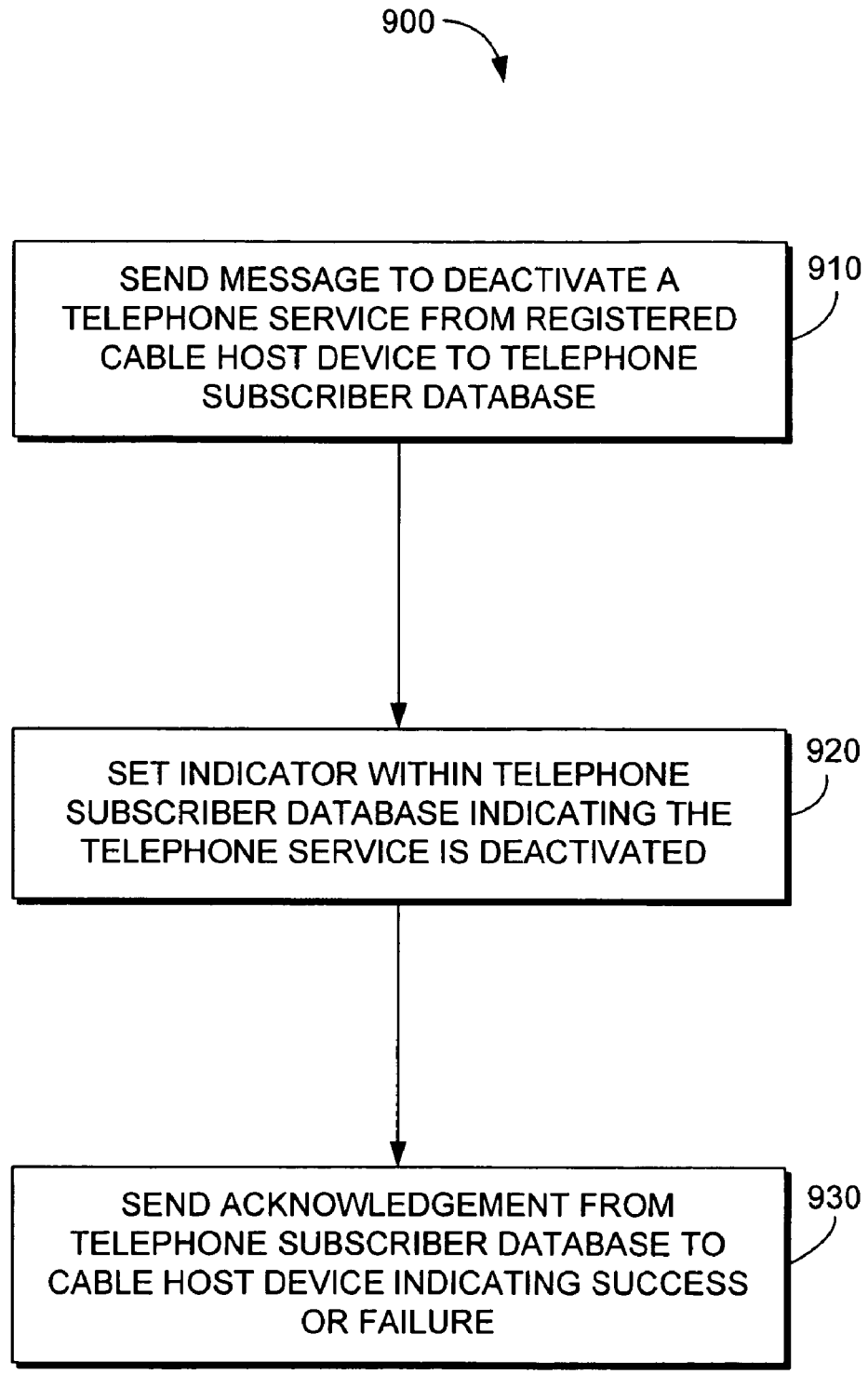
FIG. 9 illustrates a method in accordance with an embodiment of the present invention for deactivating a telephone service from a registered cable host device.

Referring now to FIG. 9, a method 900 for deactivating a new telephone service from a registered cable host device is illustrated in accordance with an embodiment of the present invention. Step 910 sends a message to deactivate a telephone service from registered cable host device 110 to telephone subscriber database 140. Step 920 sets an indicator within telephone subscriber database 140 indicating the requested telephone service is deactivated. In step 930, telephone subscriber database 140 sends an acknowledgement to cable host device 110 indicating whether the service deactivation succeeded or failed.

Figure 10:
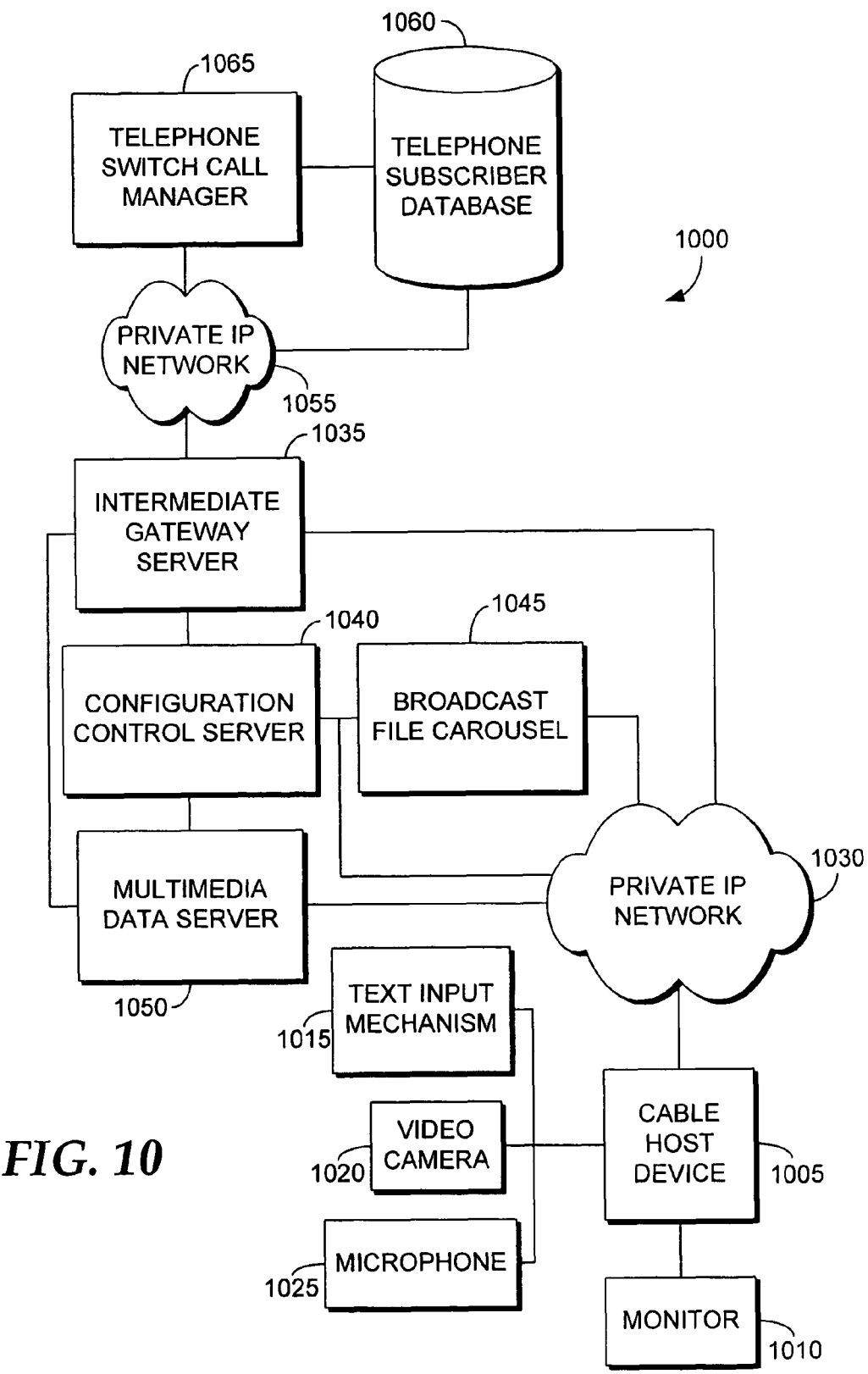
FIG. 10 illustrates a system architecture to deliver high-bandwidth telephone services via a cable host device in accordance with an embodiment of the present invention.

In FIG. 10, a system architecture 1000 for delivering high-bandwidth telephone services via a cable host device is illustrated in accordance with an embodiment of the present invention. Cable host device 1005 is connected to a monitor 1010 and peripheral input devices such as a text input mechanism 1015, video camera 1020, and a microphone 1025. The connection between text input mechanism 1015, video camera 1020, or microphone 1025 and cable host device 1005 may be wireless, such as an infra-red remote or a Bluetooth link or directly by a cable or other physical connection such as a USB or Firewire connection. Text input mechanism 1015, video camera 1020, or microphone 1025 may directly interface with cable host device 1005 as in the case of a set-top box or may interface with cable host device 1005 via an intermediary device such as a personal computer equipped with an infra-red receiver, USB port, Firewire port or other interface.

Cable host device 1005 connects via a private IP network 1030 to an intermediate gateway server 1035, a broadcast file carousel 1045, a configuration control server 1040 and a multimedia data server 1050. Broadcast file carousel 1045 and configuration control server 1040 typically are located within a cable operator's private network. Intermediate gateway server interfaces with multimedia data server 1050 to provide high-bandwidth telephone services such a video mail, picture mail, and video conferencing. Multimedia data server 1050 may be located within the cable operator's network or the telephone carrier's network depending on implementation requirements. Intermediate gateway server 1035 connects via a second private IP network 1055 to a telephone switch call manager 1065 and a telephone subscriber database 1060. Telephone switch call manager 1065 and telephone subscriber database 1060 typically are located on a telephone carrier's private network. In the case where the cable and telephone networks are under the control of one entity, private IP networks 1030 and 1055 may be a single private IP network and the use of intermediate gateway server 1035 to bridge between the two networks may not be required.

Figure 11:
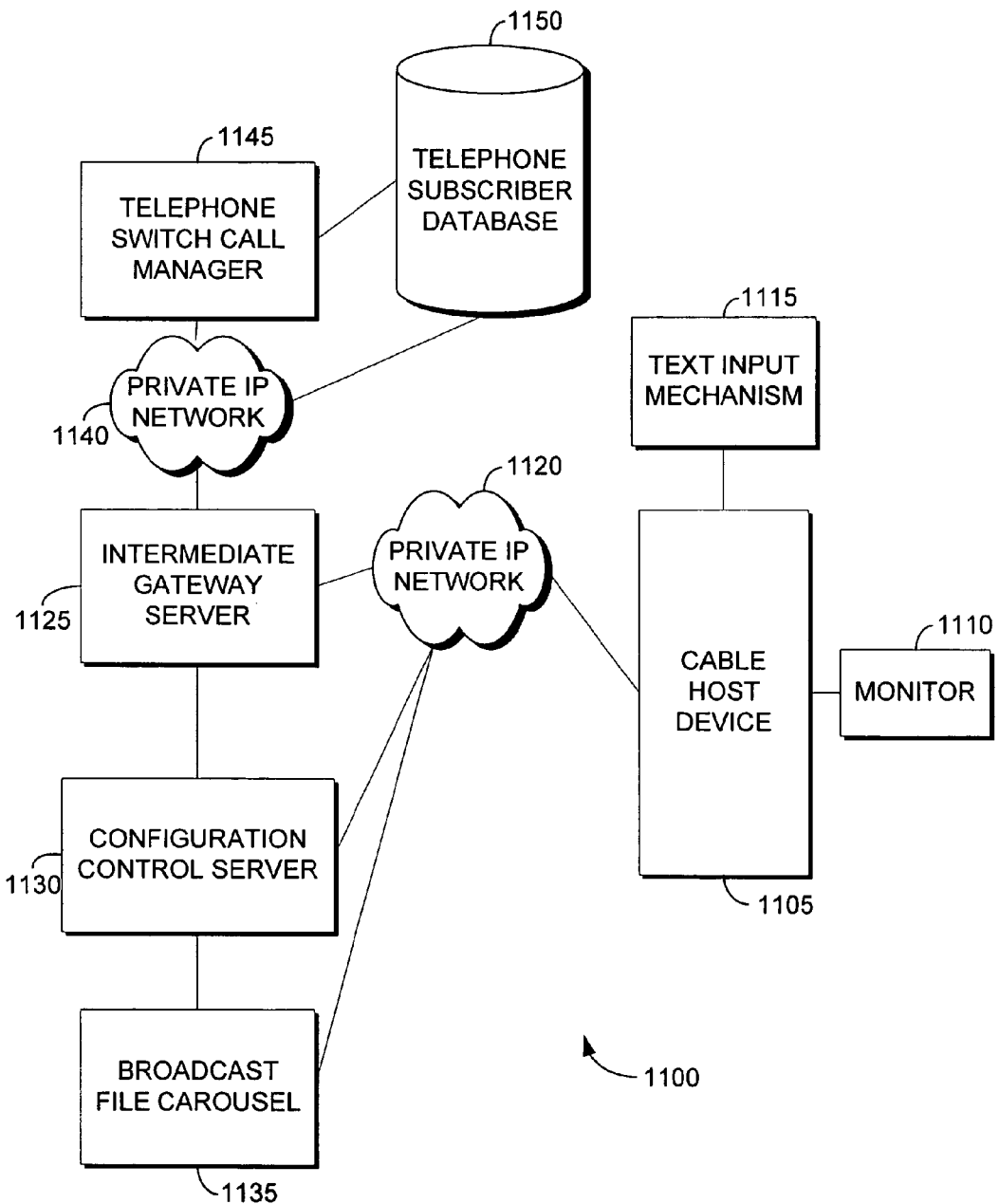
FIG. 11 illustrates a system architecture to deliver low-bandwidth telephone services via a cable host device in accordance with an embodiment of the present invention.

In FIG. 11, a system architecture 1100 for delivering low-bandwidth telephone services via a cable host device is illustrated in accordance with an embodiment of the present invention. Cable host device 1105 is connected to a monitor 1110 and a text input mechanism 1115. The connection between text input mechanism 1115 and cable host device 1105 may be wireless, such as an infra-red or a Bluetooth link or directly by a cable or other physical connection such as a USB connection. Text input mechanism 1115, may directly interface with cable host device 1105 as in the case of a set-top box or may interface with cable host device 1105 via an intermediary device such as a personal computer equipped with an infra-red receiver, USB port, Firewire port or other interface.

Cable host device 1105 connects via a private IP network 1120 to an intermediate gateway server 1125, a broadcast file carousel 1135, and a configuration control server 1130. Broadcast file carousel 1135 and configuration control server 1130 may be located within a cable operator's private network. Intermediate gateway server 1125 connects via a second private IP network 1140 to a telephone switch call manager 1145 and a telephone subscriber database 1150. In the case where the cable and telephone networks are under the control of one entity, private IP networks 1120 and 1140 may be a single private IP network and the use of intermediate gateway server 1125 to bridge between the two networks may not be required.

What is claimed is:

1. A method to provide a telephone service to a subscriber of a telecommunications network via a cable host device in a cable media-delivery network, comprising:
    the subscriber selecting a telecommunication portal channel on the cable host device;
    displaying a user interface on a monitor connected to the cable host device;
    sending an activation message from the cable host device to a telephone subscriber database on the telecommunications network containing the telephone service to be provided to the subscriber, wherein the activation message includes a telephone number of a mobile phone of the subscriber and a cable host device identification;
    associating the telephone number with the cable host device in the telephone subscriber database;
    setting an indicator within the telephone subscriber database to indicate that the telephone service is active through the cable host device, whereby the subscriber's telephone service is directed to the cable host device as an alternative mechanism to the mobile phone;
    sending a deactivation message from the cable host device to the telephone subscriber database when the telephone service to the cable host device is to be deactivated, wherein the deactivation message includes the telephone number of the mobile phone of the subscriber and the cable host device identification; and
    setting an indicator within the telephone subscriber database to indicate that the telephone service to the cable host device is inactive.

2. The method of claim 1 wherein sending the activation message from the cable host device to the telephone subscriber database comprises:
    sending a message from the cable host device to an intermediate gateway server; and
    sending the message from the intermediate gateway server to the telephone subscriber database on the telecommunications network.

3. The method of claim 1 wherein sending the activation message from the cable host device to the telephone subscriber database further comprises authentication information including a Personal Identification Number (PIN) or account identification number.

4. A system to connect a telecommunications network and a cable network for delivery of telephone services to a cable host device, comprising:
    a first private IP network for use by the telecommunications network;
    a second private IP network for use by the cable network;
    a cable host device coupled to the second private IP network;
    a monitor coupled to the cable host device;
    a broadcast file carousel component coupled to the second private IP network to store and send software to cable host device;
    a configuration control component coupled to the second private IP network to signal when new software is required to be sent from the broadcast file carousel to the cable host device;
    an intermediate gateway server that connects to both the first and second private IP networks;
    a telephone subscriber database coupled to the first private IP network; and
    a telephone switch call manager coupled to the telephone subscriber database and the first private IP network.

5. The system of claim 4 further comprising:
    a multimedia data storage component coupled to the second private IP network to host telephone services content prior to delivery to the cable host device.

6. The system of claim 4 further comprising:
    a text input mechanism that is connected to the cable host device.

7. The system of claim 4 further comprising:
    a video camera that is connected to the cable host device.

8. The system of claim 4 further comprising:
    a microphone that is connected to the cable host device.

* * * * *